United States Patent [19]

Takeuchi et al.

[11] Patent Number: 4,873,428

[45] Date of Patent: Oct. 10, 1989

[54] IMAGE PROCESSING APPARATUS USING CONVERSION MEANS

[75] Inventors: Akihiko Takeuchi; Yoji Tomoyuki, both of Yokohama, Japan

[73] Assignee: Canon Kabushiki Kaisha, Tokyo, Japan

[21] Appl. No.: 325,022

[22] Filed: Mar. 20, 1989

Related U.S. Application Data

[63] Continuation of Ser. No. 162,303, Feb. 29, 1988, abandoned.

[30] Foreign Application Priority Data

Mar. 3, 1987 [JP] Japan .................................. 62-046780
Mar. 3, 1987 [JP] Japan .................................. 62-046781
Jun. 30, 1987 [JP] Japan .................................. 62-164818

[51] Int. Cl.$^4$ ............................................. H04N 1/10
[52] U.S. Cl. ............................. 250/214 DC; 250/494; 358/293
[58] Field of Search ................ 250/209, 214, 578; 358/163, 280, 282, 293, 294; 382/49, 50, 52

[56] References Cited

U.S. PATENT DOCUMENTS

| | | | |
|---|---|---|---|
| 4,251,837 | 2/1981 | Janeway, III | 382/50 |
| 4,500,195 | 2/1985 | Hosono | 355/3 R |
| 4,563,694 | 1/1986 | Ohkubo et al. | 346/160 |
| 4,677,287 | 6/1987 | Ejima | 358/293 |
| 4,683,496 | 7/1987 | Tom | 382/49 |
| 4,723,173 | 2/1988 | Tanioka | 358/282 |
| 4,752,822 | 6/1988 | Kawamura | 358/75 |

Primary Examiner—David C. Nelms
Assistant Examiner—Stephone B. Allen
Attorney, Agent, or Firm—Fitzpatrick, Cella, Harper & Scinto

[57] ABSTRACT

An image processing apparatus comprises an image data generator and a characteristic converter for converting a characteristic of the image data generated by the image data generator. The characteristic converter includes a table for converting the image data in a first mode and a second table for converting in a second mode. The first and second tables are selectively used in recording one image. Data generator for generating data to be stored in the first and second conversion tables has a reference characteristic conversion table to be used as a base in generating the data.

26 Claims, 16 Drawing Sheets

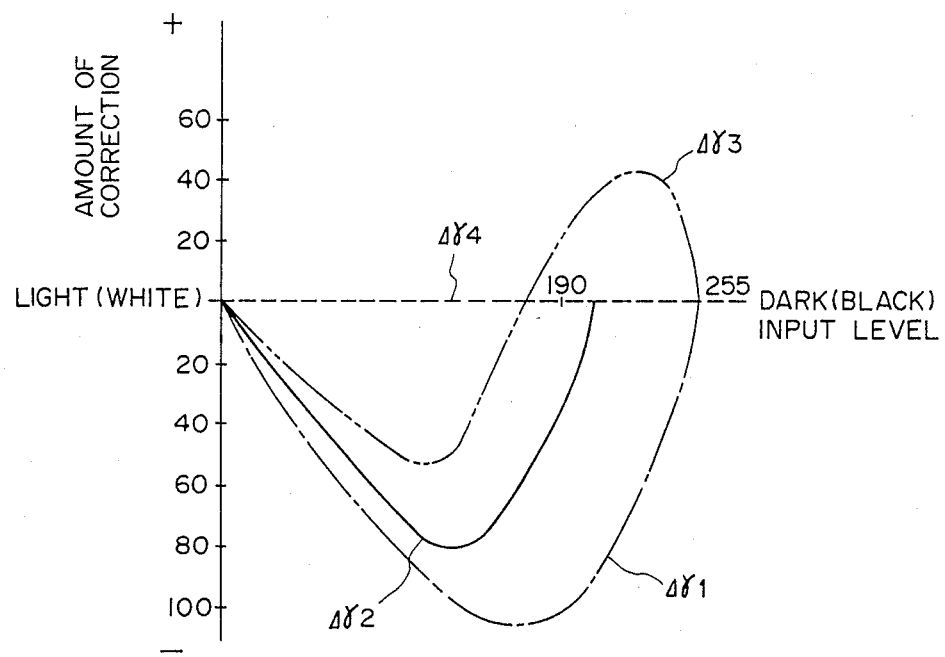
F I G. 17

IMAGE PROCESSING APPARATUS USING CONVERSION MEANS

This application is a continuation of application Ser. No. 162,303 filed Feb. 29, 1988 now abandoned.

BACKGROUND OF THE INVENTION

1. Field of the Invention

The present invention relates to an image processing apparatus for processing an image signal.

2. Related Background Art

Dither method and density pattern method have been well known as techniques to represent a half-tone image. In either case, however, sufficient tonality is not attained by a threshold matrix of a small size. A larger size threshold matrix may be used but, in this case, resolution is significantly lowered.

On the other hand, a technique to improve tonality by a relatively simple apparatus while maintaining a high resolution has been proposed by the assignee of the present invention. In that technique, when a digital image signal is binarized and an image is formed by a laser beam printer, the digital image signal is converted to an analog signal which is compared with a periodic pattern signal such as a ramp (triangular) signal to produce a pulse-width modulated binary signal, which is used as a drive signal for a laser light source so that the tonality for the half-tone image is improved. The analog image signal, ramp wave and the binary signal resulting from the pulse-width modulation are shown in FIG. 10.

By pulse-width modulating the digital image signal, the high resolution and the high tonality are compatible. In such a conversion, if a tonality which exactly represents that of an original image is to be reproduced, compensation must be done while taking an input characteristic of a document reader and an output density characteristic of a printer into consideration.

FIG. 11 shows a block diagram of an image forming apparatus having a $\gamma$ correction (tonality correction) function, by a pulse width modulation system proposed by the assignee of the present invention.

Optical image information reflected by a document (not shown) is converted to an analog electrical signal by a CCD 111. The analog electrical signal from the CCD 111 is amplified to an appropriate level by an amplifier 12, and the resulting analog signal is converted to a digital signal by an A/D converter 113. A tonality ($\gamma$) correction circuit 114 corrects a variation of tonality of the digital signal between an image input and an image output. Usually, the input tonality signal is converted to a corrected tonality signal by referencing a look-up table which contains tonality correction constants of a system stored in a ROM. The corrected digital image signal is again converted to an analog signal by a D/A converter 115, and the resulting analog signal is compared with a ramp wave signal generated by a ramp wave generator 117. Numeral 116 denotes a comparator, an output of which is a binary image signal which is pulse-width modulated with a density. The binary image signal is supplied to a printer 118 to control turn-on and turn-off of a laser light emission so that a half-tone image is produced. Namely, the half-tone image is formed by controlling light emission period of the laser.

Major factors to determine the $\gamma$ characteristic are an input characteristic (a characteristic for converting the output of the CCD 111 to the analog electrical signal) and an output characteristic (a density characteristic to form a final record image from the pulse width modulation of the printer 118). The CCD 111 usually has a monotonous characteristic relative to light intensity, and the printer 118 has one of various characteristics depending on the system.

FIG. 12 shows a typical example of the input characteristic when a laser beam printer of an electro-photographic system is used, and an example of the $\gamma$ correction table.

For a density in a quadrant II, the density of the CCD 111 exhibits a characteristic shown in a quadrant I. The printer characteristic is shown in a quadrant III. In order to attain an output characteristic which exactly represents an input characteristic, the density input by the CCD 111 must be $\gamma$-corrected as shown in the quadrant III. Thus, a correction table shown in a quadrant IV is provided in the tonality ($\gamma$) correction circuit 114 of FIG. 11.

As seen from FIG. 12, in order to attain a linear tonality shown in the quadrant II, it has been found that there is a factor which causes a significant quantization error in the digital input-output characteristic shown in the quadrant IV and a remarkable pseudo-outline is created in a low density area. Namely, a gradient of the digital input-output characteristic in the low density area in the quadrant IV is very low, that is, approximately 1/5 to 1/10 of a theoretical gradient. Accordingly, even if there are 64 tonalities in the input image, the output image has only 12 tonalities, or in a worst case, 6 tonalities. If the gradient is 1/5 of the theoretical one, it means that the output changes by one step when the input changes by five steps. As a result, the reproducibility of the tonality is reduced by a factor of five by the quantization error. It cannot be said that the CCD's or printers of the same type have no variation, and when such variations are accumulated, different output images are formed for one document.

As described above, the techniques to reproduce a high quality image by using ramp wave or table are disclosed in U.S. Application Ser. No. 029,386, U.S. Pat. No. 4,679,074, U.S. Application Ser. No. 051,154, U.S. Application Ser. No. 770,770, U.S. Application Ser. No. 870,421, U.S. Application Ser. No. 900,603, U.S. Application Ser. No. 919,763, U.S. Application Ser. No. 010,539, U.S. Application Ser. No. 923,026, U.S. Application Ser. No. 932,030, U.S. Application Ser. No. 012,322 and U.S. Application Ser. No. 013,629.

However, an image processing apparatus having a higher quality of reproduced image has been demanded.

SUMMARY OF THE INVENTION

It is an object of the present invention to eliminate the above disadvantages.

It is another object of the present invention to provide an improved image processing apparatus.

It is a further object of the present invention to provide an image processing apparatus which can reproduce a high quality of image.

It is still another object of the present invention to provide an image processing apparatus which can reproduce a good image with a simple construction.

It is still a further object of the present invention to provide a high speed image processing apparatus which can reproduce a high quality of image.

It is another object of the present invention to provide an image processing apparatus which can reproduce a high tonality and high resolution image.

It is a further object of the present invention to provide an image processing apparatus which can correct input image information in accordance with a characteristic of the apparatus and reproduce a highly fine image.

Other objects of the present invention will be apparent from the description of the invention.

BRIEF DESCRIPTION OF THE DRAWINGS

FIG. 17 shows a characteristic of corrected data;

DETAILED DESCRIPTION OF THE PREFERRED EMBODIMENTS

Embodiments of the present invention will be explained in detail with reference to the drawings.

[Configuration (FIG. 1)]

Figure 1:
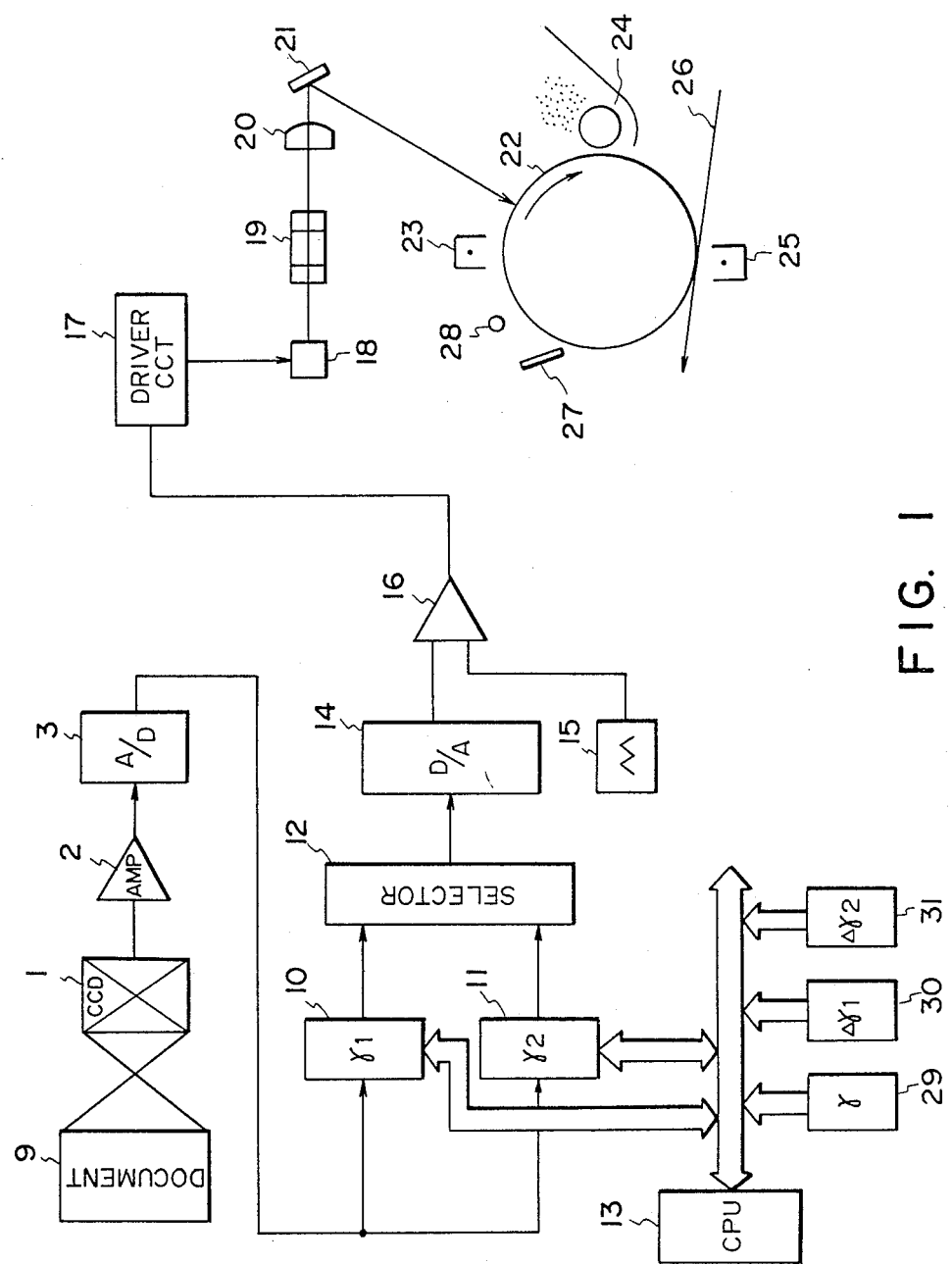
FIG. 1 shows a block diagram of one embodiment of the present invention.

FIG. 1 shows a block diagram of an embodiment of the image processing apparatus of the present invention. The present invention is applied to a laser beam printer. A laser beam scans a photo-conductor drum in synchronism with reading of a document to form an image.

A document 9 is read by CCD 1, and a resulting analog image signal is amplified to an appropriate level by an amplifier 2. Then, it is converted to an 8-bit (0–255 tonalities) digital image signals by an A/D converter 3. Then, the digital image signal passes through $\gamma$ converter (look-up tables each comprising a 256-byte RAM) 10 and 11, and one of them is selected by a selector 12. (The selection is done for each main scan, as will be explained in detail later). Each of $\gamma$ correction values stored in the $\gamma$ converters 10 and 11 is a sum of a reference $\gamma$ value stored in a reference $\gamma$ conversion table 29 and $\Delta\gamma_1$ in a correction table 30 or $\Delta\gamma_2$ in a correction table 31. The converter 10 converts with a correction value of the reference converts with a correction value of the reference $\gamma + \Delta\gamma_1 (=\gamma_1)$, and the $\gamma$ converter 11 converts with a correction value of the reference $\gamma + \Delta\gamma_2 (=\gamma_2)$.

The digital image signal passes through the $\gamma$ converters 10 and 11 having the references $\gamma_1$ and $\gamma_2$, respectively. The selector 12 selects one of the corrected image data and supplies it to a D/A converter 14. The digital signal supplied to the D/A converter 14 is again converted to an analog signal, which is compared by a comparator 16 with a signal of a predetermined period generated by a ramp wave generator 15 so that it is pulse-modulated. The pulse-width modulated binary image signal is applied to a laser driver 17 for use as an on/off control signal for light emission of a laser diode 18. The laser beam emitted from the laser diode 18 is scanned by a well-known polygon mirror 19 in a main scan direction and directed through a f/$\theta$ lens 20 and a reflection mirror 21 to a photo-conductor drum 22 which rotates in a direction of an arrow to form an electrostatic latent image. In the present embodiment, the photo-conductor drum 22 is an a-Si photo-conductor drum which has a stable potential for aging. It is uniformly disclosed by a exposure 28 and then uniformly charged with a positive polarity by a charger 23. Then, the laser beam is directed to form the electrostatic latent image representing the image signal. In the present embodiment, areas to be developed (black pixels) are exposed by the light. A so-called image scan system is carried out. Thus, toners having a positive charge characteristic are deposited onto those areas of the photo-conductor drum 22 which were discharged by the laser so that the areas are visualized. The visual image (toner image having a positive charge) formed on the photo-conductor drum 22 is transferred to a record medium (usually a paper) by a transfer charger 25 with a negative corona discharge. Residual toner left on the photo-conductor drum 22 without being transferred because of a transfer efficiency is scraped off by a cleaner 27. Then, the above series of process is repeated.

[$\gamma$ Converter (FIG. 2A - FIG. 4B)]

The $\gamma$ converters 10 and 11 are now explained with reference to the reference $\gamma$ conversion table 29 and the correction tables 30 and 31 of FIG. 1.

Figure 2A:
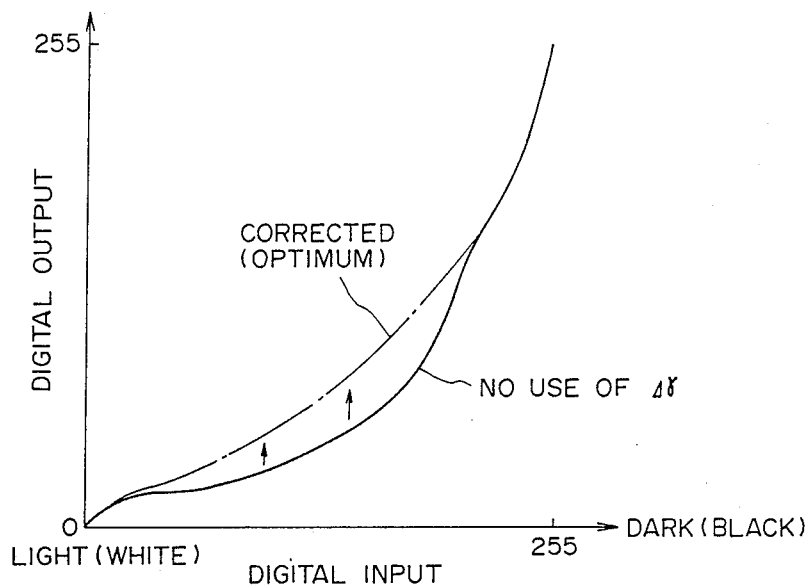
FIGS. 2A and 2B show input/output characteristics before and after correction of an image, respectively.
Figure 2B:
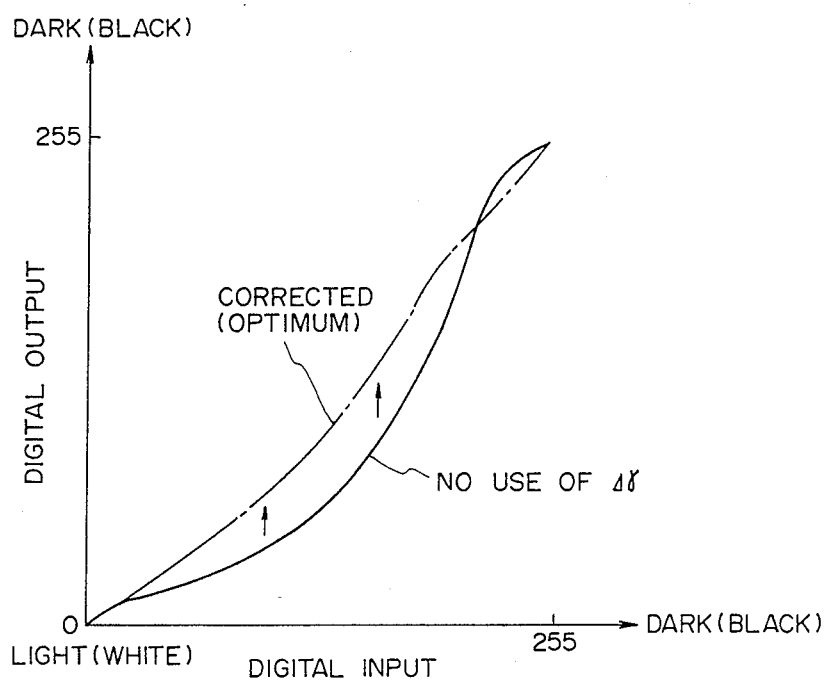
Figure 12:
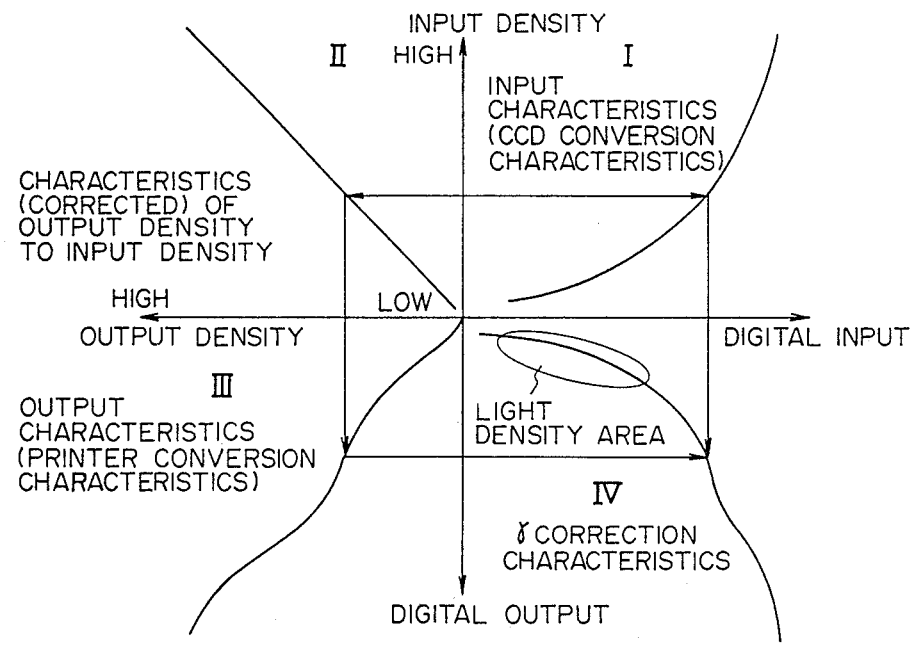
FIG. 12 shows an input/output characteristic curve of an image.

A solid line in FIG. 2A shows a case where the correction tables 30 and 31 are not used (which is equivalent to a case where one $\gamma$ correction circuit is used) and a digital input-output characteristic is one shown in a quadrant IV of FIG. 12 (a quantization error is large in a low density area), and a solid line in FIG. 2B shows another case (the quantization error is larger in intermediate and high density areas). In any case, in FIGS. 2A and 2B, it is ideal that the input-output density characteristic curve is that shown by a chain line. Thus, as the information in the reference $\gamma$ conversion table 29 (which is a ROM), the $\gamma$ correction data shown by the chain lines of FIGS. 2A and 2B, that is, theoretical data corrected for the quantization error is used, and as the information in the correction tables 30 and 31 (which are ROM's), the data shown in FIGS. 3A and 3B, that is, correction data for reducing the quantization error is used. Prior to the start of operation of the present apparatus, the sums of the data of the reference $\gamma$ conversion table 29 and the data of the correction table ($\Delta\gamma_1$) 30 are stored in the $\gamma$ converter 10 (which is a RAM), and the sums of the data of the reference conversion table 29 and the data of the correction table ($\Delta\gamma_2$) 31 are stored in the $\gamma$ converter 11 (which is a RAM).

Figure 3A:
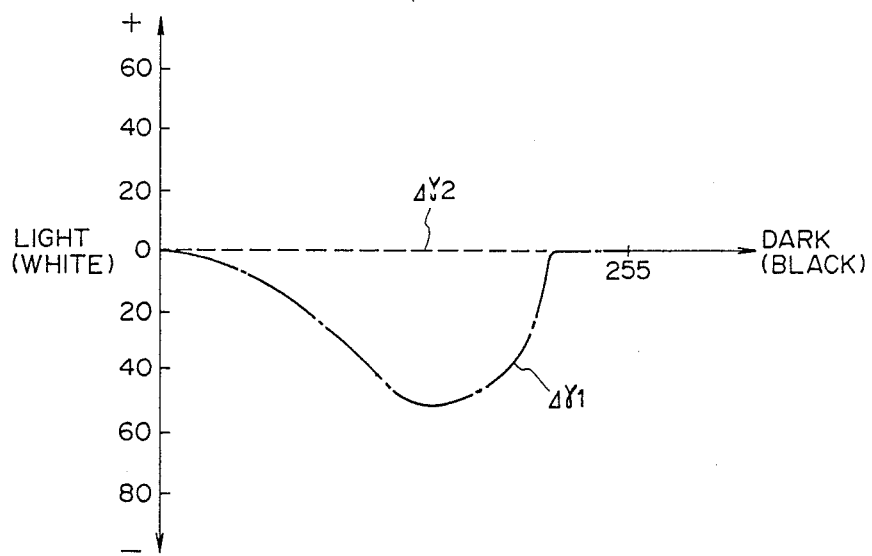
FIGS. 3A and 3B show characteristic curves of correction tables 30 and 31 in the embodiment.
Figure 3B:
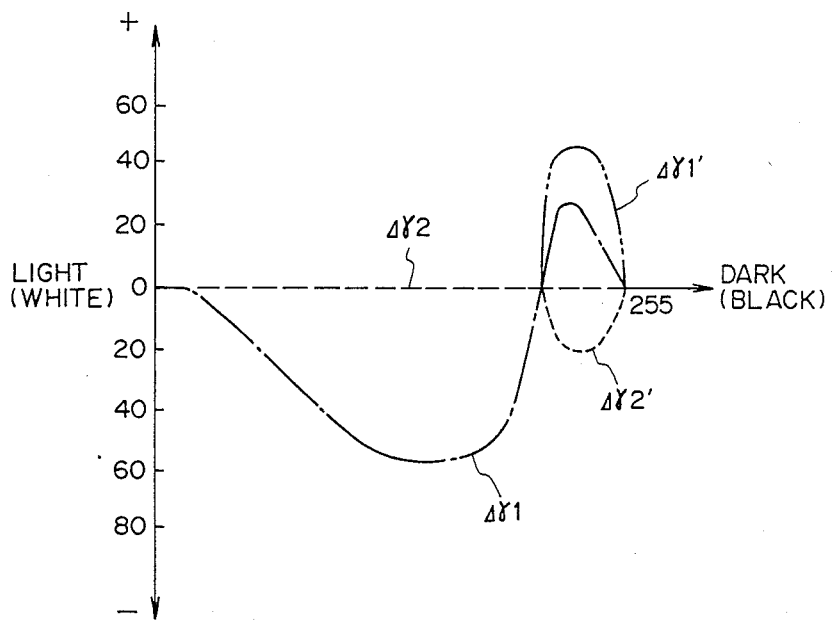
Figure 4A:
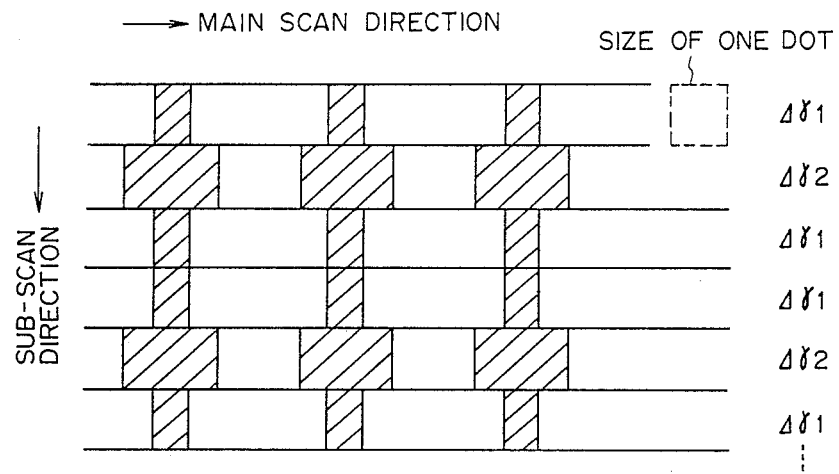
FIG. 4A shows an output image is the embodiment for a relatively low density.
Figure 4B:
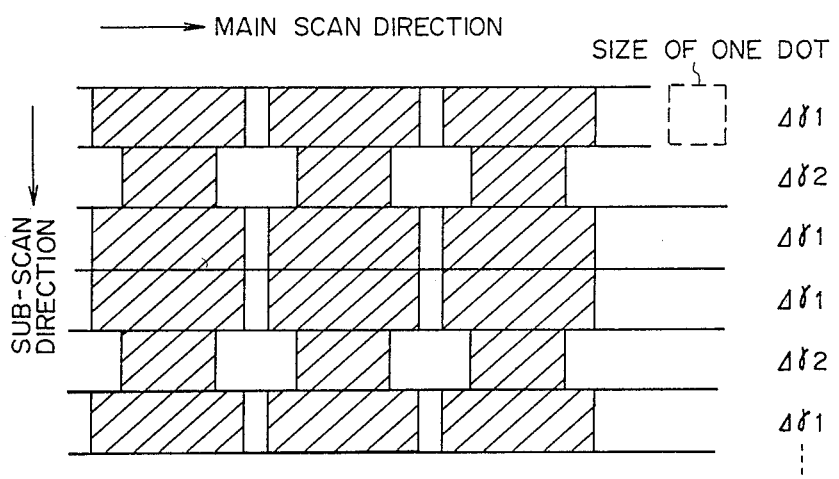
FIG. 4B shows an output image in the embodiment for a relatively high density.

The switching of the $\gamma$ converters 10 and 11 uses three main scan lines per period. The $\gamma$ corrections for n-th line and (n+2)th line use the $\gamma$ converter 10 with $\Delta\gamma_1$ correction, and the $\gamma$ correction of (n+1)th line uses the $\gamma$ converter 11 with $\Delta\gamma_2$ correction. In this manner, an apparatus $\gamma$ characteristic of the system is improved from the solid lines (without correction) to chain lines (with correction) in FIGS. 2A and 2B. In the present embodiment, in FIGS. 2A and 3A, the quantization error of the $\gamma$ conversion characteristic in the low density area is corrected by $\Delta\gamma_1$, and $\Delta\gamma_2$ has zero correction. In FIGS. 2B and 3B, the correction in the high density area is done by $\Delta\gamma_1$. In the high density area, $\Delta\gamma_1'$ may be used in place of $\Delta\gamma_1$ and $\Delta\gamma_2'$ may be used in place of $\Delta\gamma_2$. FIGS. 4A and 4B show electrical signals representing the image pattern on the photo-conductor drum when such a correction is done. FIG. 4A shows an example in the low density area of FIG. 2A and FIG. 4B shows an example in the high density area in FIG. 2B. A hatched area is a laser activation area. Those figures are drawn based on the theoretical image signal and different from the latent image or developed image on the photoconductor drum. In the formation of the latent image, the responses of the laser driver and the laser, the spot diameter of the laser and the MTF of the photoconductor drum relate, and in the development, the particle size of the developer, the developing characteristic (half-tone reproducibility) and the edge effect relate. Accordingly, it is apparent from the complex non-linear profile of the printer output characteristic shown in the quadrant III of FIG. 12 that the final density reproducibility is significantly different from the hatched areas of FIGS. 4A and 4B.

In this manner, the linearity of the reference $\gamma$ conversion table 29 can be significantly improved by using the correction tables 30 and 31. The $\Delta\gamma_2$ of the correction table 31 gives few data because a center of 3×3 dot matrix pixels is formed on a main scan component corresponding to $\Delta\gamma_2$ and since it plays an important role on the image quality, a quasi-outline may be readily produced if that area is distored by the correction data.

[Second Embodiment (FIGS. 5 - 7)]

In the present embodiment, the reference $\gamma$ conversion table 29 is independent from the correction tables 30 and 31. In the above embodiment, the reference $\gamma$ conversion table 29 comprises a ROM. If it comprises a RAM and the contents thereof are maintained by a back-up power supply, the $\gamma$ characteristic may be rewritten in compliance with the system characteristic.

Figure 5:
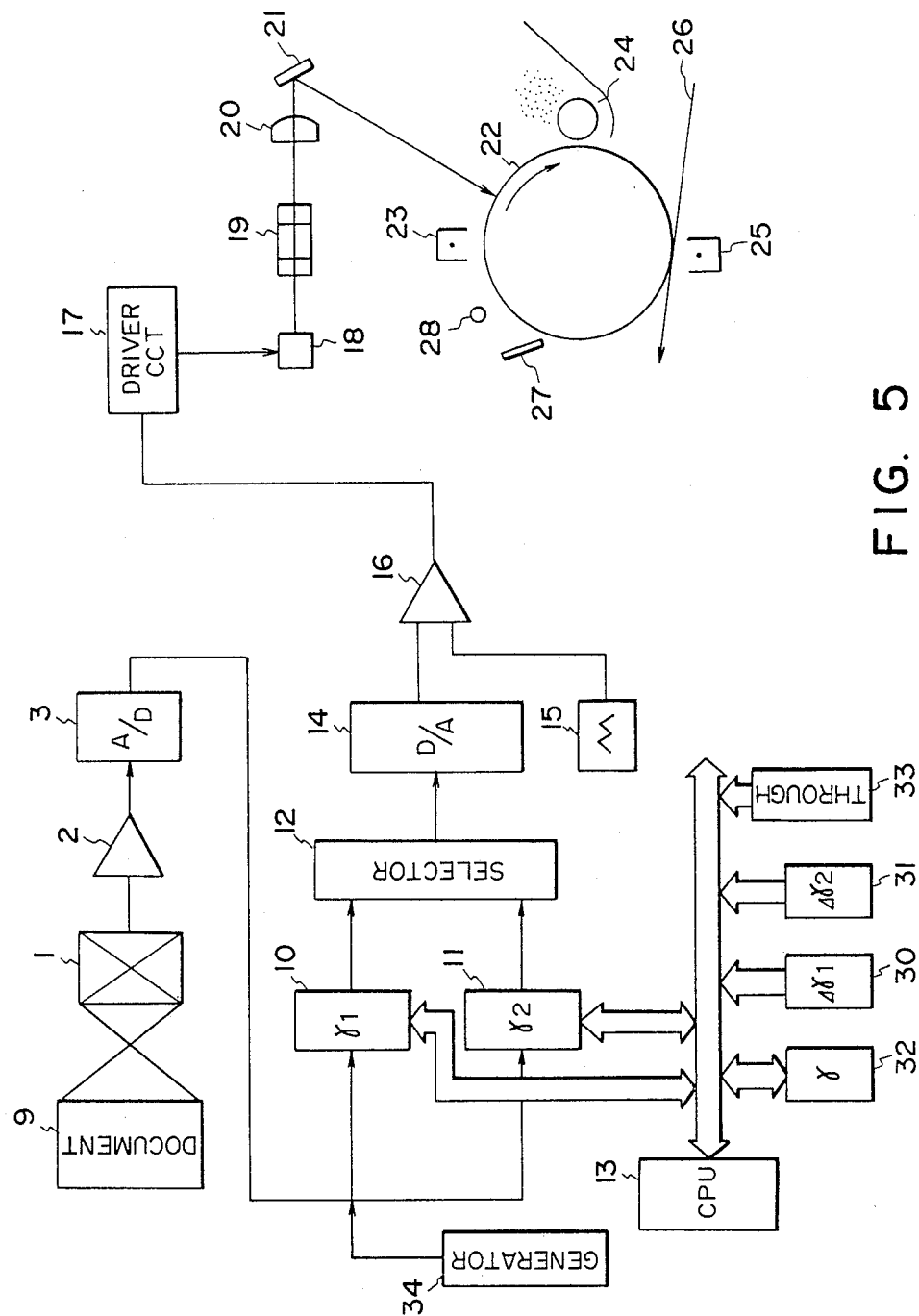
FIG. 5 shows a block diagram of a second embodiment of the present invention.

This is explained with reference to FIG. 5, in which a RAM 32 is used in place of the reference $\gamma$ correction table 29 comprising the ROM of FIG. 1, and a through-ROM 33 which does not convert data and a generator 34 which sequentially outputs data 0-255 are additionally provided.

Figure 6:
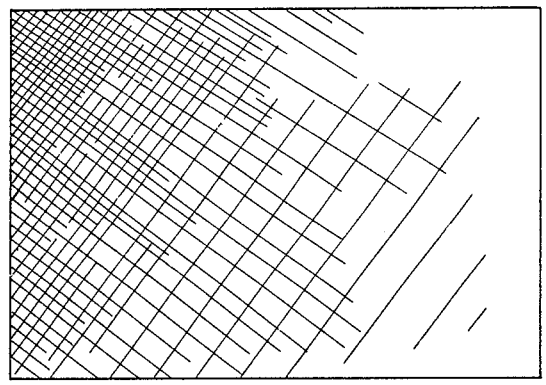
FIG. 6 shows an example of an output image for adjusting an input/output characteristic in the embodiment of FIG. 5.
Figure 7:
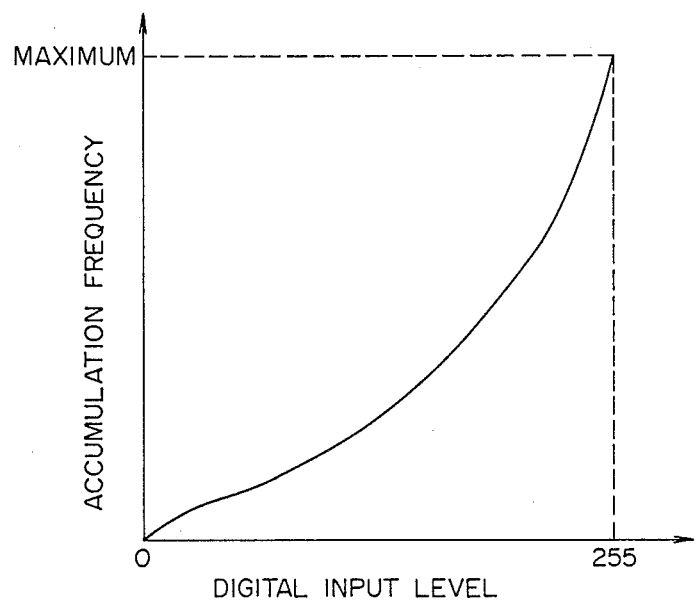
FIG. 7 shows a frequency histogram when the image of FIG. 6 is input.

An example of a method for measuring the $\gamma$ characteristic of the system is explained below like the previous embodiment, the through-ROM 33 is used in place of the RAM 32 and it is corrected by $\Delta\gamma_1$ and $\Delta\gamma_2$ and the results are stored in the $\gamma$ converters 10 and 11, respectively. The generator 34 sequentially generates the white level data "0" to the black level data "255", which are supplied to a printer through the $\gamma$ converters 10 and 11 so that an image of a size A3 is formed. An example of the output is shown in FIG. 6. Then, the print-out is loaded to a reader (not shown) in place of the document 9 and it is read by the CCD 1. An accumulated frequency histogram of the read result is shown in FIG. 7, in which an abscissa represents an input level read by the reader and an ordinate represents the number of data or accumulated frequency of each level. This accumulated frequency histogram is, for example, a curve of a broken line in FIG. 2A. For example, the accumulated frequency is calculated by using a microcomputer 13 and it is normalized such that a maximum accumulated frequency is equal to 255, and they are allotted as data to addresses 0 to 255 of the RAM 32.

In this manner, by constructing the reference $\gamma$ conversion table 32 by the RAM independently from the correction table, the $\gamma$ characteristic can be readily formed and the system is immediately responsible to any change of characteristic in the image input unit or the printer unit.

[Third Embodiment (FIGS. 8 and 9)]

Figure 8:
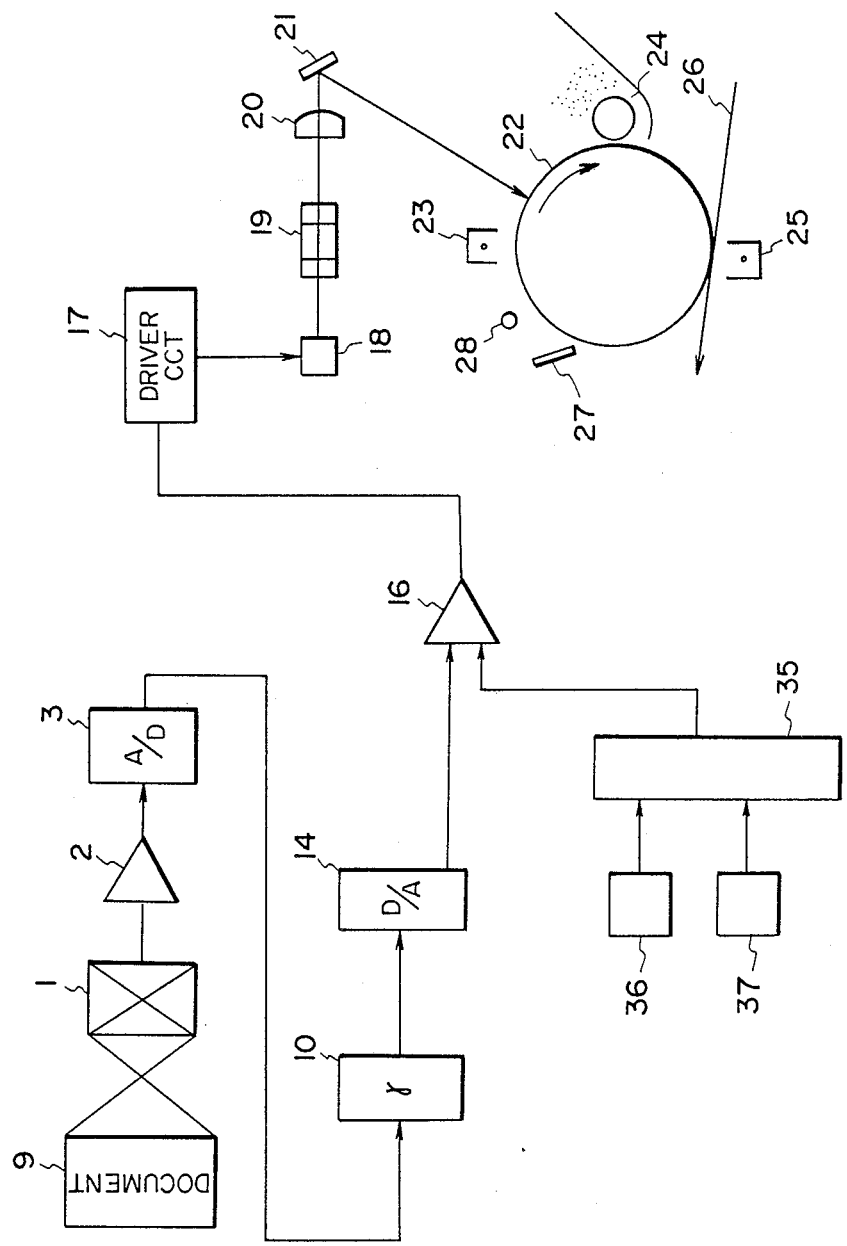
FIG. 8 shows a block diagram of a third embodiment.
Figure 9:
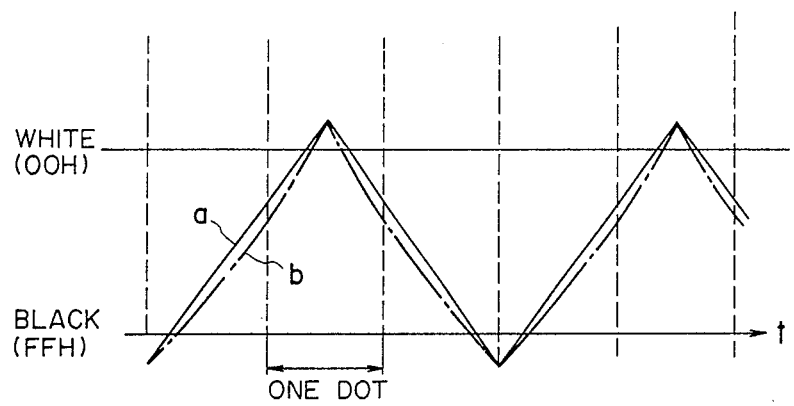
FIG. 9 shows an output signal waveform of a pattern signal generator in FIG. 8.
Figure 10:
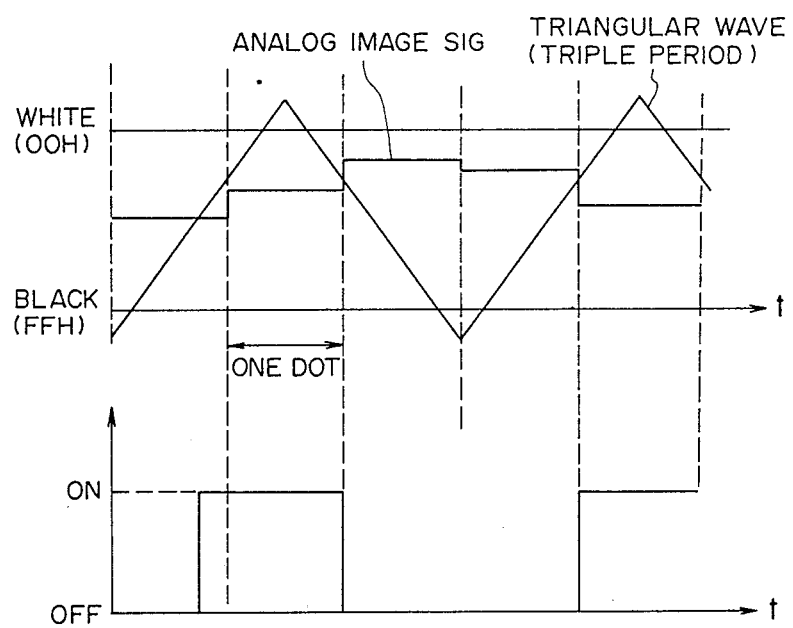
FIG. 10 shows a principle of pulse width modulation.
Figure 11:
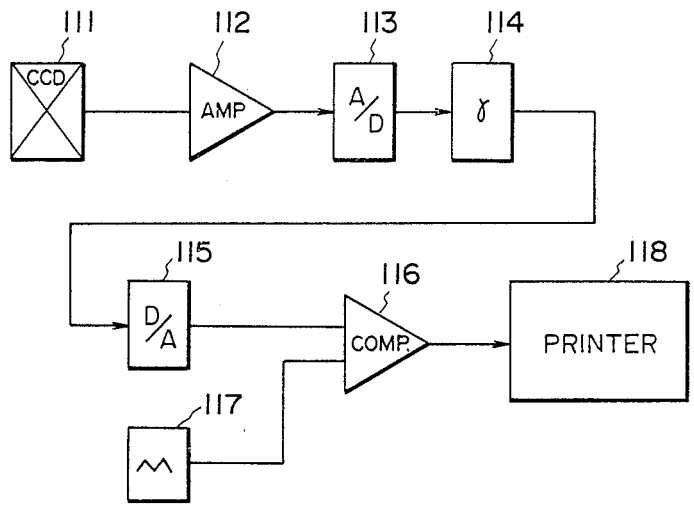
FIG. 11 shows a block diagram which has been proposed by the assignee of the present invention.

The two embodiments have been explained. The same effect may be attained by using a plurality of pattern signals of a predetermined period instead of the correction table. Such a block diagram is shown in FIG. 8. Examples of waveforms of the pattern signal generators 36 and 37 are shown in FIGS. 9A and 9B. Numeral 35 denotes an analog switch which selects one of the pattern signals (ramp waves) of the pattern signal generators 36 and 37 and supplies it to a comparator 16. The ramp wave a generated by the pattern generator 36 for each scan line and the ramp wave b generated by the pattern generator 37 are selected by the analog switch in the sequence of b, a, b, and they are pulse-width modulated to form an image. In accordance with the first embodiment described above, the ramp wave b corresponds to the function of the correction table 31.

In accordance with the present embodiment, the $\gamma$ conversion table or pattern signal for determining the pulse width modulation in forming the output image is switched for each one line of input image so that the tonality is improved in forming the output image and the creation of the quasi-outline is prevented. Further, the $\gamma$ converters 10 and 11 and the reference $\gamma$ conversion table 29 are constructed by rewritable RAM's and the sample output image is read to finely adjust values of the $\gamma$ table in the $\gamma$ correction circuit so that a high quality output image is formed without being affected by the characteristic of the entire system or the environment in which the system is put (for example, a room with light and dark areas).

In the above embodiments, $\Delta\gamma_2$ is used as a table for defining a center of pixel and $\Delta\gamma_1$ and $\Delta\gamma_2$ are used as tables for reducing the input/output quantization error. Alternatively, a plurality of tables other than $\Delta\gamma_1$ and $\Delta\gamma_2$, which have similar functions may be provided. In the first embodiment, when a start position of writing in the main scan direction is appropriately shifted and the image is formed as shown in FIGS. 4A and 4B, the repetitive period of the pixels is more hardly visible. In this case, the output characteristic of the printer is different from those shown in FIGS. 2 and 12 but the present embodiment is equally applicable.

In the present embodiment, the correction table or pattern signal is switched for each scan unit of the input image and the pulse width modulation is carried out to form the output image. If the printer allows an output of a higher resolution, the output image may be formed by three or more times of output operations per one line of input image.

In the present embodiment, the printer is a laser beam printer. The present embodiment is also applicable to an image forming apparatus which uses an LED array having a number of small light emitting diodes (LED's) arranged and controls turn-on and turn-off thereof in accordance with a modulation signal to expose a light to an electro-photographic photo-conductor to form an image thereon. The present embodiment is further applicable to a printer of other type such as a thermal transfer printer by controlling a heating time of a head by a pulse width modulation. The present embodiment is applicable to any printer in which a pixel area in the output image is varied.

In the above embodiments, the reversal development method by the image scan is used. Alternatively, the present invention is equally applicable to a positive development method by the background scan in which a background white area is scanned.

If high fidelity image reproduction is not required, various output images may be formed by manipulating the reference $\gamma$ conversion table or correction table.

Figure 14:
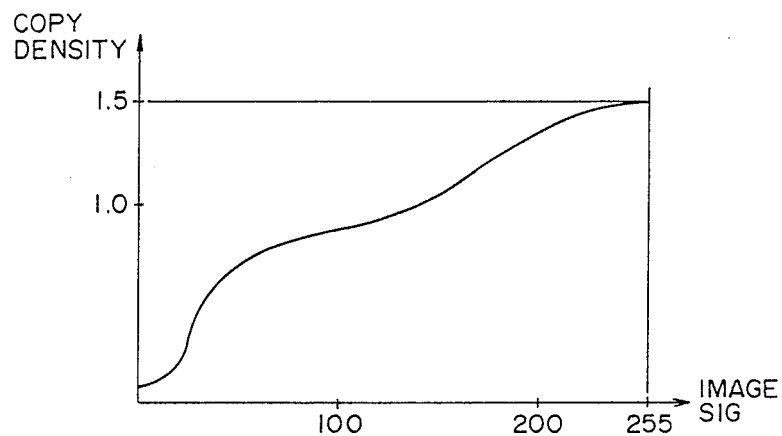
FIG. 14 shows an example of an image signal-image density characteristic in a printer.
Figure 15A:
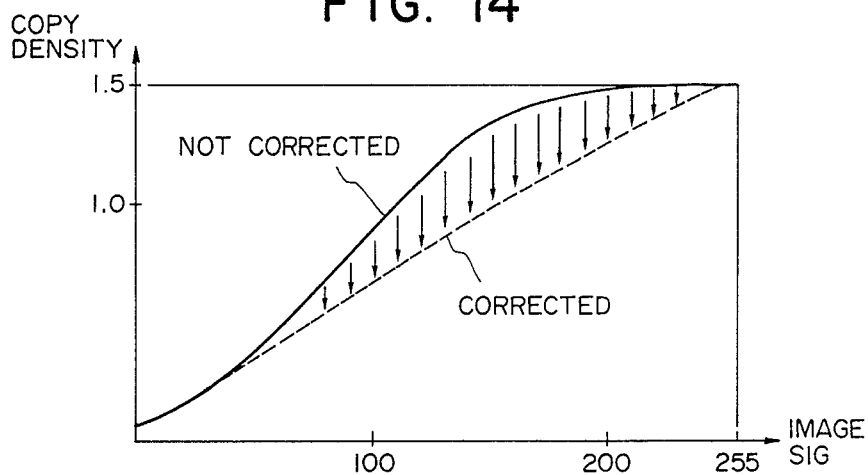
FIGS. 15A and 15B show examples of image signal-image density characteristics of a prior art apparatus and an embodiment of the present invention, respectively.
Figure 15B:
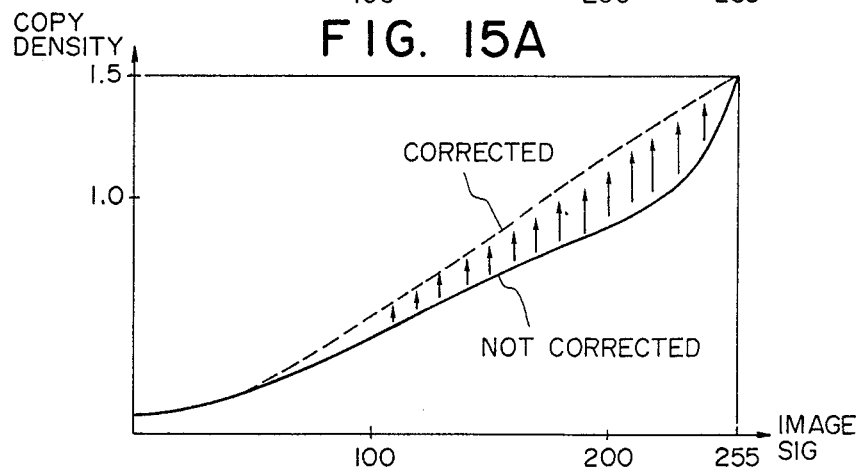

A fourth embodiment is now explained. As described above, it has been proved that in order to achieve the linear tonality as shown in the quadrant II of FIG. 12, a large quantization error is included in the digital input-output characteristic shown in the quadrant IV, because the relation ship between the image signal and copy density in the printer 118 shows the characteristic as shown in FIG. 14 and a remarkable quasi-outline is created in the low density area. In order to compensate it, in the first embodiment, the $\gamma$ conversion table for correcting the tonality of the output image and means which independently corrects the tonality for each main scan line are provided. However, since the output density characteristic of the printer significantly varies with a photo-conductor, the image (particularly black image) significantly changes as the photo-conductor changes and a stable image is not formed by mere correction of the white image. For example, a relation between the image signal and the copy density has no tonality in the black area as shown in FIG. 15A or the black area has a low density as shown in FIG. 15B.

If it is corrected by the Y conversion table, the halftone is not continuous and the quasi-outline is created in the black area.

The present embodiment solves the above problems.

Figure 13:
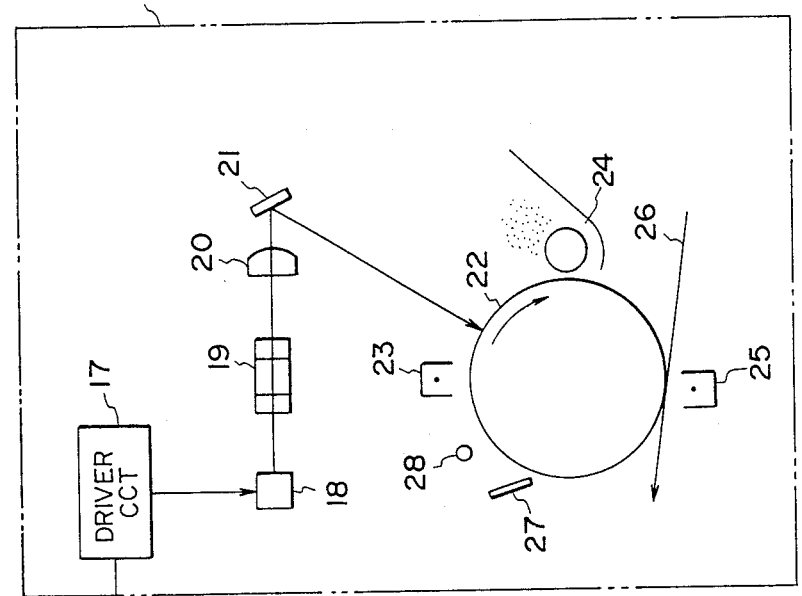
FIG. 13 shows a fourth embodiment of the present invention.
Figure 13:
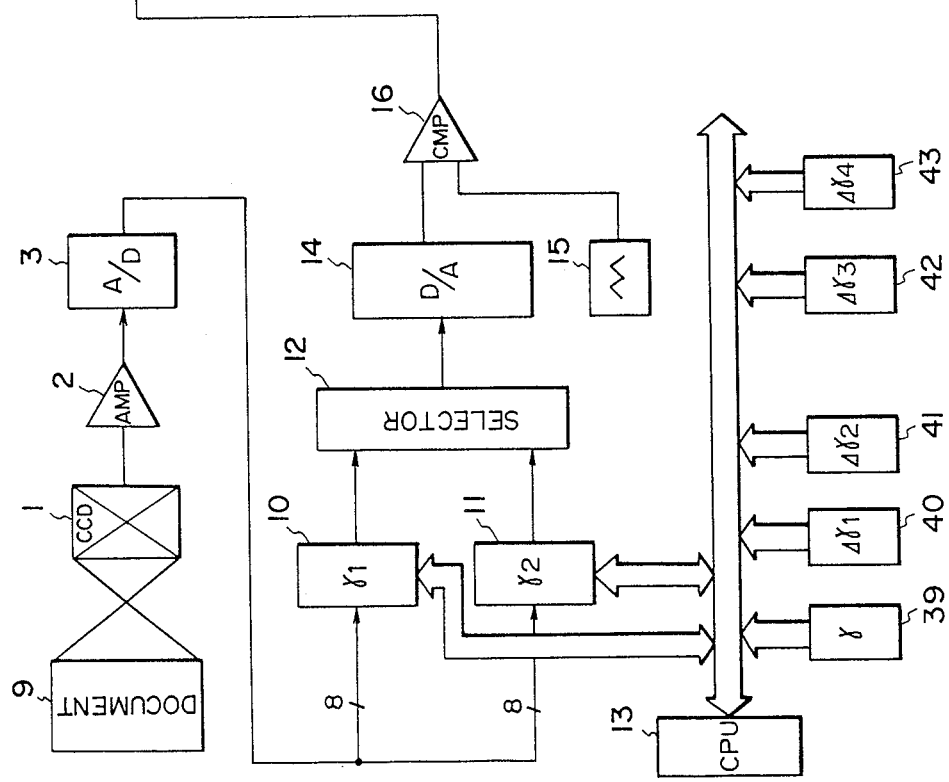

FIG. 13 shows a fourth embodiment of the image forming apparatus of the present invention. In FIG. 13, the like elements to those shown in FIG. 1 are designated by the like numerals. In the present embodiment, the printer 78 is a well-known laser beam printer. A laser beam is raster-scanned on the photo-conductor drum in synchronism with the reading of the document to write information. Numerals on the lines indicate the numbers of bits.

The operation of the apparatus of FIG. 13 is explained. The document 9 is read by the CCD 1 in the reader and the resulting analog image signal is amplified to a predetermined level by the amplifier 2. It is then converted to an 8-bit digital image signal by the A/D converter 3.

The digital image signal is then applied to the $\gamma$ conversion tables 10 and 11 each of which comprises a 256-byte RAM, and one of them is selected by the selector 12. The $\gamma$ conversion tables 10 and 11 store data adjusted by two of the correction data $\Delta\gamma_1$, $\Delta\gamma_2$, $\Delta\gamma_3$ and $\Delta\gamma_4$ based on the $\gamma$ curve stored in the memory 39. The selection is made for each main scan as will be explained in detail hereinlater.

The image signal selected by the selector 12 is applied to the D/A converter 14 where it is again converted to an analog image signal. The comparator 16 compares the analog image signal with a ramp wave signal having a triple-period to that of an image clock, generated by the ramp wave generator 15 so that it is pulse-width modulated. The pulse-width modulated binary signal is applied to the laser driver 17 which uses it as an on-off control signal for the light emission by the laser diode 18. The laser beam emitted from the laser diode 18 is scanned in the main scan direction by the well-known polygon mirror 19, and directed through the f/0 lens 20 and the reflection mirror 21 to the photo-conductor drum 22 which rotates in a direction of an arrow so that an electrostatic latent image is formed thereon. In the present embodiment, the photo-conductor drum 22 is an A-Si photo-conductor drum which has a stable potential to the aging. It is uniformly discharged by the discharger 28 and then positively charged by the charger 23. Then, it is exposed by the laser beam so that the electrostatic latent image is formed thereon in accordance with the image signal. In the present embodiment, areas to be developed (black pixels) are exposed to the laser beam (image scan system). Thus, the developing unit 24 carries out the well-known reversal development so that toners having a positive charge characteristic are deposited to those areas of the photo-conductor drum 22 which have been discharged by the laser. The visual image (toner image having the positive charge) formed on the photo-conductor drum 22 is transferred by the transfer charger 25 onto the transfer medium (usually paper) 26 by negative corona charge. The residual toners which are left on the photo-conductor drum 22 without being transferred due to a transfer efficiency are scraped off by the cleaner 27, and the above sequence of process is again repeated.

The functions of the $\gamma$ conversion tables 10 and 11, the $\gamma$ conversion basic table 39 and the correction tables 40 - 43 of FIG. 13 are explained. In the present embodiment, random access memories (RAM's) are used for the tables 10 and 11, and read-only memories (ROM's) are used for the tables 39–43. The ROM 39 contains $\gamma$ conversion basic data, the ROM's 40–42 contain correction data reflecting the characteristic of the photo-conductor, and the ROM 43 contains zero-correction data.

In the present embodiment, prior to the operation of the apparatus, one of the ROM's 40–42 is selected, and the basic data of the ROM 39 is corrected by the data of the selected ROM, and the corrected data is loaded into the RAM 10. The data in the ROM 39 is corrected by the data in the ROM 43 (actually no correction) and the corrected data is loaded into the RAM 11.

The loading of the data into the RAM's 10 and 11 is carried out by the CPU 13. The RAM's 10 and 11 are switched for every third main scan line. The RAM 10 is used for n-th and (n+2)th lines (n being a natural number) and the RAM 11 is used for the (n+1)th line.

In the present embodiment, the ROM 43 ($\Delta\gamma_4$) contains zero-correction data because a pixel center of a 3×3 dot matrix is formed in a main scan component corresponding to $\Delta\gamma_4$ and it plays an important role to the image quality. If a correction is made to this area, it is hard to comply with the reader which reads the document to generate the image signal, and the image apts to include a quasi-outline.

Figure 16A:
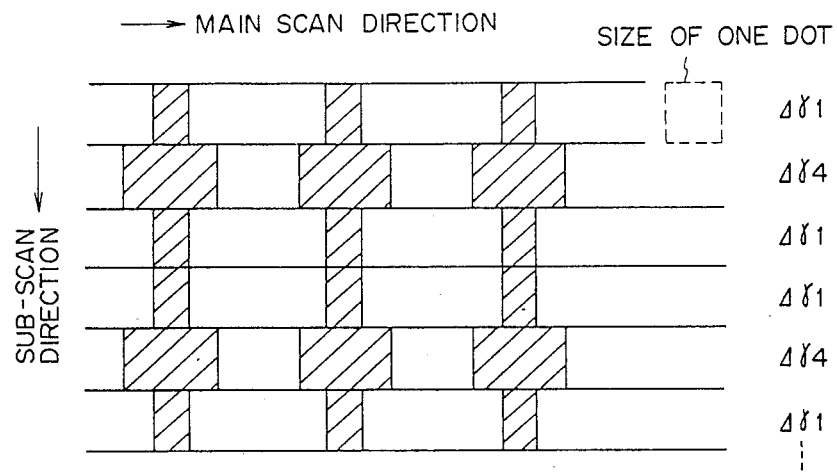
FIGS. 16A and 16B show examples of image outputs in the fourth embodiment.
Figure 16B:
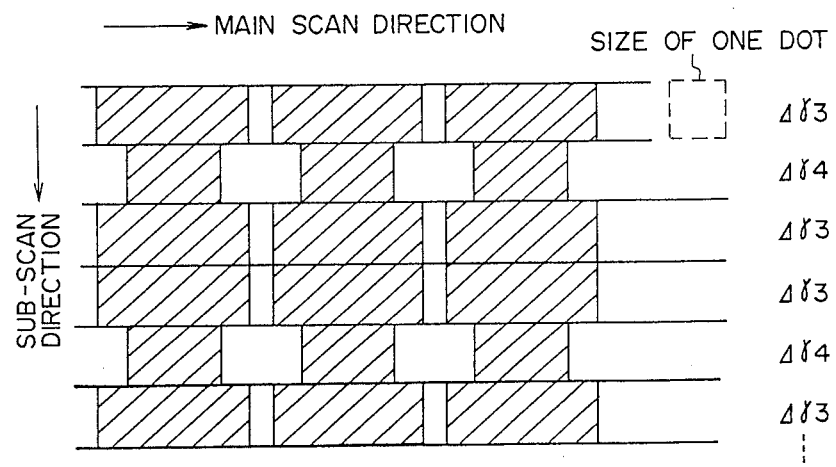

FIGS. 16A and 16B show an example of record of the image pattern on the photo-conductor drum formed in accordance with the image signal when the above correction is effected. In FIG. 16A, the correction is negative and in FIG. 16B, the correction is positive. The hatched area corresponds to a laser activation area. FIGS. 16A and 16B are drawn based on a theoretical image signal and it is different from the electrostatic latent image or visual image actually formed on the photo-conductor drum, because in the formation of the latent image, the responses of the laser driven and the laser, the spot diameter of the laser and the MTF of the photo-conductor drum relate, and in the development of the image, the particle size of the toner, the development characteristic (half-tone reproducibility) and the edge effect relate. It is seen that the final density reproducibility is significantly different from the hatched area of FIGS. 16A and 16B because the output characteristic of the printer shown in the quadrant III of FIG. 12 exhibits a complex non-linear characteristic.

FIG. 17 shows the correction data $\Delta\gamma_1$ - $\Delta\gamma_4$ stored in the ROM's 40–43.

By providing a plurality of correction tables as shown in FIGS. 13 and 17 and selecting an appropriate correction table in accordance with the drum used, the image signal copy density characteristics are improved from the solid lines to the broken lines shown in FIGS. 15A and 15B.

In the present embodiment, the correction table is selected by reading a standard chart by the reader. The images corrected by the correction tables $\Delta\gamma_1$ - $\Delta\gamma_3$, respectively, are output and they are visually judged so that a most appropriate correction table is selected by a switch.

Figure 18:
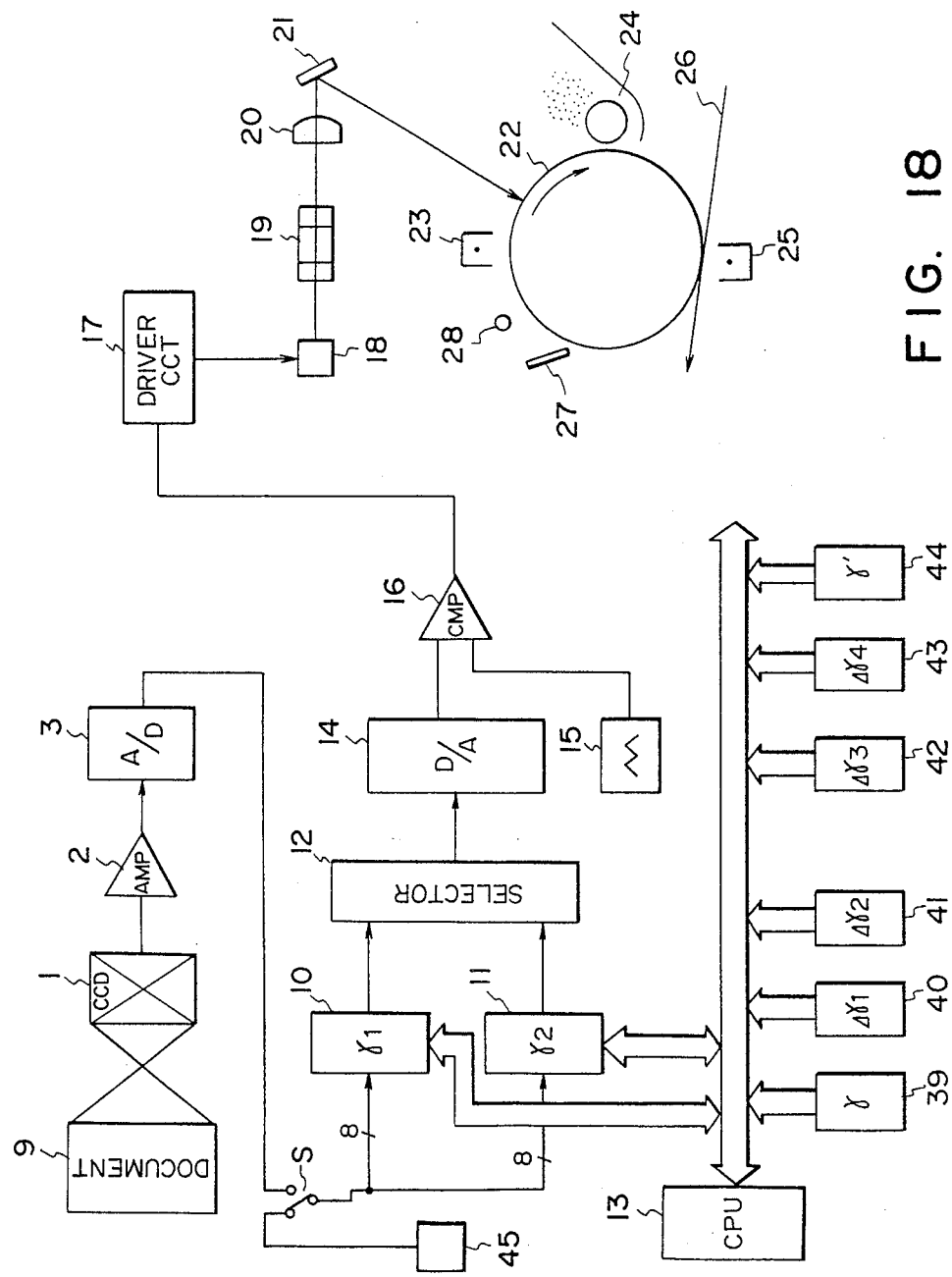
FIG. 18 shows a fifth embodiment.

[Fifth Embodiment (FIG. 18)]

In the fourth embodiment, the correction table is selected by outputting several images. Another method is explained with reference to FIG. 18, in which the like elements to those shown in FIG. 13 are designated by the like numerals.

Like in the fourth embodiment, the correction tables $\Delta\gamma_1$ - $\Delta\gamma_4$ are prestored in the ROM's 40–43. A ROM 44 for determined which one of the correction tables $\Delta\gamma_1$ - $\Delta\gamma_4$ is to be selected is provided The content of the ROM 44 is explained. An input level of the image signal having a large difference of amount of correction in the correction tables $\Delta\gamma_1$ - $\Delta\gamma_4$ is represented by A. In FIG. 17, the difference between the amount of correction $\Delta\gamma_1$ and the amount of correction $\Delta\gamma_3$ is maximum when the input level is 190 (A=190).

For values of $\Delta\gamma_1$ - $\Delta\gamma_4$ corresponding to the input level A (In FIG. 17, $\Delta\gamma_1 = -106$, $\Delta\gamma_2 = -32$, $\Delta\gamma_3 = +18$, $\Delta\gamma_4 = 0$) are stored in the ROM 44.

Figure 19:
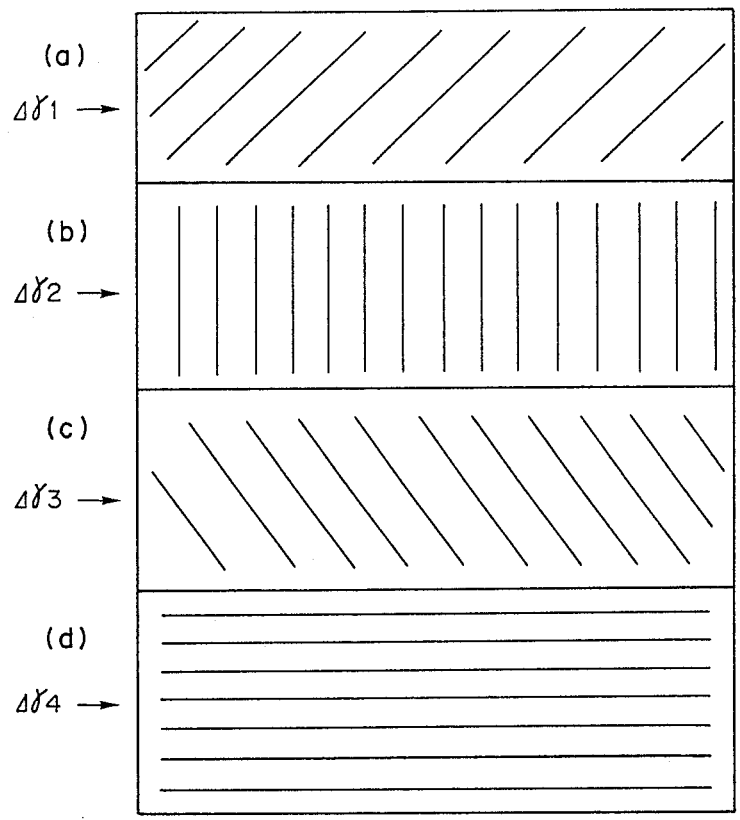
FIG. 19 show example of image output when corrected data of $\Delta\gamma_1$ - $\Delta\gamma_4$ are used.

The selection of the correction table is explained. The input level A of the image signal having the largest difference of amount of correction (in FIG. 17, A=190) is generated by the generator 45 through a switch S. It is corrected by the ROM 44, and the images corrected by $\Delta\gamma_1$ - $\Delta\gamma_4$ for the predetermined input signal A (A=190 in the present embodiment) are printed out on one record sheet as shown in FIG. 19. (FIG. 19A shows the image corrected by $\Delta\gamma_1$, and FIGS. 19B to 19D show the images corrected by $\Delta\gamma_2$ to $\Delta\gamma_4$, respectively.)

An output image density desirable to the input signal A is represented by R. The images on the document 9 shown in FIG. 19 are read by the reader, and the image densities of the images of FIGS. 19A - 19D by the respective corrections are stored. Then, one of the output image densities corrected by $\Delta\gamma_1$ - $\Delta\gamma_4$ which is closest to the desired density R is selected.

For example, if the image corrected by $\Delta\gamma_2$ for the image signal having the input level A can produce an output image closest to R, the optimum correction table for that photo-conductor is $\Delta\gamma_2$ and the ROM 41 is used as the correction table.

In the present embodiment, the correction is made in the n-th and (n+2)th lines of the three main scan line and no correction is made in the (n+1)th line, as are done in the first embodiment.

[Sixth Embodiment (FIG. 20)]

Instead of the selection methods of the correction tables described in the fourth embodiment and fifth embodiment, the correction table may be selected based on a characteristic of the photo-conductor drum (E-V characteristic). The E-V characteristics of the photo-conductor (particularly a-Si photo-conductor) are categorized as one having a spread in bottom area as shown in FIG. 20A, one having no spread in the bottom area as shown in FIG. 20B, and one which is intermediate of FIGS. 20A and 20B, as shown in FIG. 20C.

When the photo-conductor having the characteristic of FIG. 20A is used, a black area of the image has no resolution. When the photo-conductor having the characteristic shown in FIG. 20B is used, a light image is produced. When the photo-conductor having the characteristic shown in FIG. 20C is used, a proper tonality is attained by the conventional correction.

Since the E-V characteristic of the photo-conductor and the output image have the above relationship, the E-V characteristic of the photo-conductor can be detected by rotating the photo-conductor drum, exposing laser beams of several levels to the photo-conductor drum and detecting the surface potentials by a sensor. They are stored in the reader to maintain the relationship between the E-V characteristic and the correction table for the selection of the correction table. For example, when the E-V characteristic is one shown in FIG. 20A, the $\Delta\gamma_1$ correction table ROM 40 is selected, when the E-V characteristic is one shown in FIG. 20B, the $\Delta\gamma_3$ correction table ROM 42 is used, and when the E-V characteristic is one shown in FIG. 20C, the $\Delta\gamma_2$ correction table ROM 41 is selected.

[Seventh Embodiment]

In the present embodiment, at least two of the photo-conductor drum, developing unit and cleaner are integrated in a cartridge.

Figure 20:
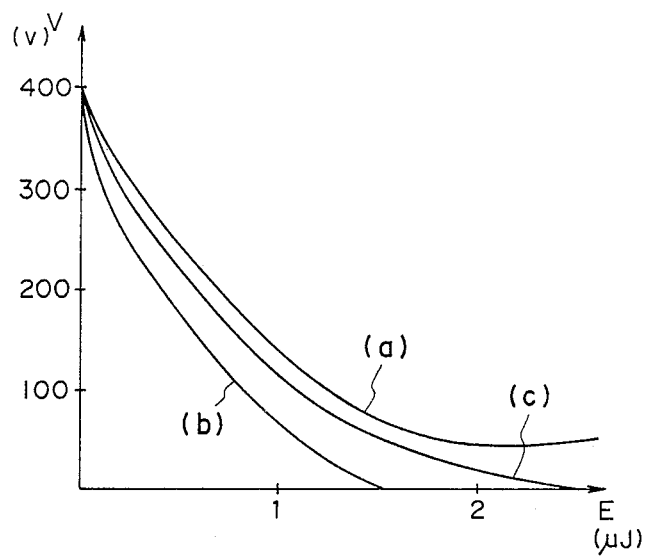
FIG. 20 shows an E-V characteristic of a photo-sensor.
Figure 21:
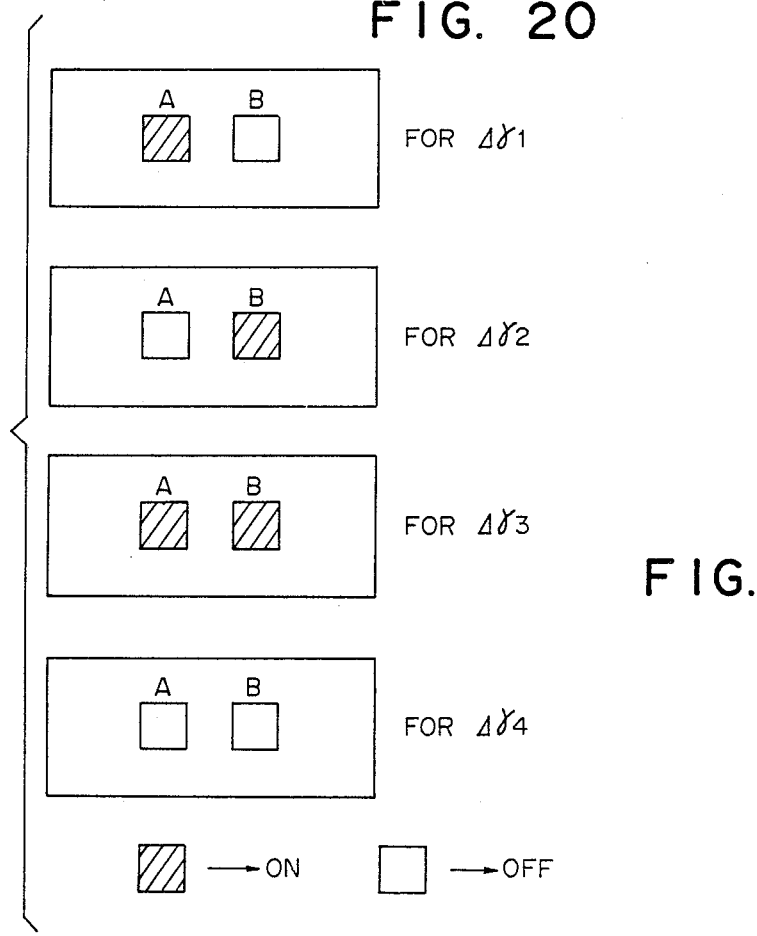
FIG. 21 shows a signal coma provided in a cartridge.

The E-V characteristic as shown in FIG. 20 is measured and optimum correction tables for the characteristic of the photo-conductor drum used is selected. Sensors are arranged in the apparatus so that when the cartridge is loaded into the apparatus, the appropriate correction table for the drum is selected by a coma signal. Accordingly, as the cartridge is loaded into the apparatus, the correction table is selected in accordance with the characteristic of the cartridge.

In the above embodiments, a range of image selection can be widened by generating pattern signals of various waveforms so that they are combined with various correction tables.

The number of correction tables for the drum may be appropriately selected in accordance with the capacity of the memory used.

In the present embodiment, a laser beam printer is used as the image forming apparatus. The present embodiment is equally applicable, without change of spirit of the present embodiment, to an image forming apparatus (LED printer) which uses an LED array having a number of fine light emitting diodes (LED's) arranged and controls turn-on and turn-off of the LED's in accordance with a modulation signal to expose light to an electro-photographic photo-conductor.

In the present embodiment, the reversal development method by the image scan system is used. The present embodiment is equally applicable to the positive image method by the background scan system in which the background white area is scanned. The scan effect can be achieved in other types of printer such as a thermal transfer printer by controlling the heating time of the head by pulse width modulation. The present invention is applicable to any printer which has an area modulation feature.

The present invention is not limited to the embodiments described above but various modifications thereof may be made without departing from the scope of claim.

We claim:

1. An image processing apparatus comprising:
   image data generation means;
   characteristic conversion means for converting a characteristic of image data generated by said image data generation means;
   said characteristic conversion means including a first conversion table for converting the characteristic of the image data in a first mode, and a second conversion table for converting the characteristic of the image data in a second mode different from the first mode;
   said first and second conversion tables being selectively used in recording one image; and
   data formation means for forming data to be stored in said first and second conversion tables;
   said data formation means having a reference characteristic conversion table to be used as a base in forming the data.

2. An image processing apparatus according to claim 1 further comprising record means for recording the image line by line in accordance with the converted image data outputted by said characteristic conversion means;
   said first and second conversion tables being switched for each line.

3. An image processing apparatus according to claim 1 wherein said data formation means has first and second correction tables corresponding to said first and second conversion tables, respectively, and said reference characteristic conversion table and said first correction table are used in forming the data to be stored in said first conversion table.

4. An image processing apparatus according to claim 1 further comprising pattern signal generation means for generating a pattern signal of a predetermined period and modulation means for producing a pulse width modulated signal based on the converted image data outputted by said characteristic conversion means and said pattern signal.

5. An image processing apparatus according to claim 4 further comprising record means for recording the image on a photo-sensitive member by modulating a beam in accordance with the pulse width modulated signal outputted by said modulation means;
   the data stored in said first and second tables being associated with a characteristic of said photo-sensitive member.

6. An image processing apparatus comprising:
   image data generation means;
   characteristic conversion means for converting a characteristic of image data generated by said image data generation means;
   said characteristic conversion means including first and second conversion tables for converting the characteristic of the image data;
   said first conversion table having a substantially linear input-output data conversion characteristic;
   said second conversion table having a different input-output data conversion characteristic than that of said first conversion table;
   said first and second conversion tables being selectively used in processing one image; and
   data formation means for forming data to be stored in said first and second conversion tables;
   said data formation means having a reference characteristic conversion table to be used as a base in forming the data.

7. An image processing apparatus according to claim 6 further comprising record means for recording the image line by line in accordance with the converted image data outputted by said characteristic conversion means;
   said first and second conversion tables being switched for each line.

8. An image processing apparatus according to claim 6 wherein said data formation means includes first and second correction tables corresponding to said first conversion table, and one of said first and second correction tables and said reference characteristic conversion table are used in forming the data to be stored in said first conversion table.

9. An image processing apparatus according to claim 6 further comprising pattern signal generation means for generating a pattern signal of a predetermined period and modulation means for producing a pulse width modulated signal based on the converted image data outputted by said characteristic conversion means and said pattern signal.

10. An image processing apparatus according to claim 9 further comprising record means for recording the image on a photo-sensitive member by modulating a beam in accordance with the pulse width modulated signal outputted by said modulation means;
    the data stored in said first and second tables being associated with a characteristic of said photo-sensitive member.

11. An image processing apparatus comprising:
    image data generation means;
    characteristic conversion means for converting a characteristic of image data generated by said image data generation means;
    record means for recording an image on a record medium in accordance with the converted image data outputted by said characteristic conversion means; and signal generation means for generating a signal in association with loading of said record medium to the apparatus;

said signal being associated with a characteristic of said record medium;

said characteristic conversion means having a plurality of tables associated with the characteristic conversion of the image data; and one of said tables being selected in accordance with said signal.

12. An image processing apparatus according to claim 11, further comprising pattern signal generation means for generating a pattern signal of a predetermined period and modulation means for producing a pulse-width-modulated signal based on the converted image data outputted by said characteristic conversion means and said pattern signal.

13. An image processing apparatus according to claim 11, wherein said characteristic conversion means includes a first conversion table for converting the characteristic of the image data in a first mode and a second conversion table for converting the characteristic of the image data in a second mode different from the first mode, said first and second conversion tables being selectively used in recording one image; and said apparatus further comprising data formation means for forming data to be stored in said first and second conversion tables; said characteristic conversion means having a plurality of correction tables employed to form the data of said first and second conversion tables, and said data forming means selecting one of said correction tables in accordance with said signal.

14. An image processing apparatus according to claim 12, wherein said record medium is a photo-sensitive member and said record means records the image on the photo-sensitive member by modulating a beam in accordance with the pulse-width-modulated signal outputted by said modulation means.

15. An image processing apparatus according to claim 13, wherein said record means records the image line by line in accordance with the converted image data outputted by said characteristic conversion means, and said first and second conversion tables are switched for each line.

16. An image processing apparatus comprising:
image data generation means;
characteristic conversion means for converting a characteristic of image data generated by said image data generation means;
record means for recording an image on a record medium in accordance with the converted image data outputted by said characteristic conversion means;
signal generation means for generating a signal in association with loading of said record medium to the apparatus; and
change means for changing a mode for converting the characteristic of image data by said characteristic conversion means in accordance with the signal generated by said signal generation means.

17. An image processing apparatus according to claim 16, further comprising pattern signal generation means for generating a pattern signal of a predetermined period and modulation means for producing a pulse-width-modulated signal based on the converted image data outputted by said characteristic conversion means and said pattern signal wherein said record medium is a photo-sensitive member and said record means records the image on the photo-sensitive member by modulating a beam in accordance with the pulse-width-modulated signal outputted by said modulation means, and said signal is associated with a characteristic of said photo-sensitive member.

18. An image processing apparatus according to claim 16, wherein said change means has a plurality of correction tables employed to determine a characteristic conversion mode and selects one of said correction tables in accordance with the signal.

19. An image processing apparatus according to claim 16, wherein said characteristic conversion means includes a first conversion table for converting the characteristic of the image data in a first mode, and a second conversion table for converting the characteristic of the image data in a second mode different from the first mode, said first and second conversion tables being selectively used in recording one image.

20. An image processing apparatus according to claim 18, wherein said change means forms data for characteristic conversion in accordance with the selected correction table and stores the data in said characteristic conversion means.

21. An image processing apparatus according to claim 19, wherein said record means records the image line by line in accordance with the converted image data outputted by said characteristic conversion means, switching back and forth between said first and second conversion tables for each line.

22. An image processing apparatus comprising:
image data generation means;
characteristic conversion means for converting a characteristic of image data generated by said image data generation means;
output means for outputting a pulse-width-modulated signal in accordance with the converted image data from said characteristic conversion means;
record means for recording an image on a record medium in accordance with the pulse-width-modulated signal output by said output means;
signal generation means for generating a signal in association with loading of said record medium to the apparatus; and
change means for changing a mode for generating a pulse-width-modulated signal in accordance with the signal generated by said signal generation means.

23. An image processing apparatus according to claim 22, further comprising pattern signal generation means for generating a pattern signal of a predetermined period, wherein said pulse-width-modulated signal output means produces the pulse-width-modulated signal based on the converted image data outputted by said characteristic conversion means and said pattern signal, wherein the record medium is a photo-sensitive member, and wherein said record means records the image on the photo-sensitive member by modulating a beam in accordance with the pulse-width-modulated signal outputted by said pulse-width-modulated signal output means, and wherein said signal is associated with a characteristic of said photo-sensitive member.

24. An image processing apparatus according to claim 22, wherein said change means changes a mode for converting the characteristic of image data by said characteristic conversion means in accordance with said signal generated by said signal generation means so as to vary a mode for generating a pulse-width-modulated signal.

25. An image processing apparatus according to claim 24, wherein said change means has a plurality of correction tables employed to determine a characteristic conversion mode and selects one of said correction tables in accordance with the signal generated by said signal generation means.

26. An image processing apparatus according to claim 25, wherein said change means forms data for characteristic conversion in accordance with the selected correction table and stores the data in said characteristic conversion means.

* * * * *

UNITED STATES PATENT AND TRADEMARK OFFICE
CERTIFICATE OF CORRECTION

PATENT NO. : 4,873,428
DATED : October 10, 1989
INVENTOR(S) : AKIHIKO TAKEUCHI, ET AL.

It is certified that error appears in the above-identified patent and that said Letters Patent is hereby corrected as shown below:

COLUMN 1

Line 47, "amplifier 12," should read --amplifier 112,--.

COLUMN 2

Line 16, "$\gamma$ -corrected" should read --$\gamma$-corrected--.

COLUMN 3

Line 16, "is" should read --in--.
Line 47, "show example of image" should read --shows an example of images--.

COLUMN 4

Line 9, "converts with a correction value" should be deleted.
Line 10, "of the" should be deleted.
Line 32, "disclosed by a exposure 28" should read --discharged by a discharger 28--.

COLUMN 5

Line 28, "an-example" should read --an example--.
Line 29, "in" should read --of--.

COLUMN 6

Line 23, "responsible" should read --responsive--.
Line 33, "FIGS. 9A and 9B." should read --FIG. 9.--.

UNITED STATES PATENT AND TRADEMARK OFFICE
CERTIFICATE OF CORRECTION

PATENT NO. : 4,873,428

DATED : October 10, 1989

INVENTOR(S) : AKIHIKO TAKEUCHI, ET AL.

It is certified that error appears in the above-identified patent and that said Letters Patent is hereby corrected as shown below:

COLUMN 7

Line 36, "relation ship" should read --relationship--.
    Line 52, "Y conversion table," should read
        --Y conversion table,--.
    Lines 55-56, Insert --[Fourth Embodiment (FIG. 13)]-- as a heading between lines 55 and 56.

COLUMN 9

Line 7, "apts" should read --is apt--.
    Line 52, "determined" should read --determining--.
    Line 53, "provided" should read --provided.--.

COLUMN 11

Line 32, "of claim." should read --of the claims.--.

Signed and Sealed this

Twentieth Day of November, 1990

*Attest:*

HARRY F. MANBECK, JR.

*Attesting Officer*      *Commissioner of Patents and Trademarks*